United States Patent
Choi

(10) Patent No.: US 11,693,999 B2
(45) Date of Patent: Jul. 4, 2023

(54) SYSTEM FOR AUTOMATICALLY INSPECTING A MOLD DESIGN, AND METHOD USING SUCH (METHOD AND SYSTEM FOR CHECKING A PRESS)

(71) Applicant: GM GLOBAL TECHNOLOGY OPERATIONS LLC, Detroit, MI (US)

(72) Inventor: Yongkwon Choi, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 281 days.

(21) Appl. No.: 17/072,509

(22) Filed: Oct. 16, 2020

(65) Prior Publication Data
US 2021/0117591 A1 Apr. 22, 2021

(30) Foreign Application Priority Data
Oct. 16, 2019 (KR) .................. KR10-2019-0128540

(51) Int. Cl.
*G06F 30/20* (2020.01)
*G06F 30/12* (2020.01)
*G01G 19/00* (2006.01)

(52) U.S. Cl.
CPC .............. *G06F 30/20* (2020.01); *G06F 30/12* (2020.01); *G01G 19/00* (2013.01)

(58) Field of Classification Search
CPC ...... G06F 30/20; G06F 30/12; G05B 19/4093
See application file for complete search history.

(56) References Cited

U.S. PATENT DOCUMENTS

| 6,490,498 | B1 | 12/2002 | Takagi | |
|---|---|---|---|---|
| 11,030,352 | B2 * | 6/2021 | Hama | G06F 30/00 |
| 2004/0244174 | A1 * | 12/2004 | Juranitch | B23P 19/02 29/788 |
| 2010/0185312 | A1 * | 7/2010 | Wang | G06F 30/20 703/7 |

FOREIGN PATENT DOCUMENTS

| CN | 107657661 | * | 2/2018 |
|---|---|---|---|
| JP | 3338373 B2 | | 10/2002 |
| JP | 3405176 B2 | | 5/2003 |
| JP | 5281325 B2 | | 9/2013 |

OTHER PUBLICATIONS

Hariya et al., "Technique for checking Design Rules for Three-Dimensional CAD Data,", 2010 3rd International Conference on Computer Science and Information Technology, 2010.*

* cited by examiner

*Primary Examiner* — Catherine T. Rastovski
(74) *Attorney, Agent, or Firm* — Cantor Colburn LLP

(57) ABSTRACT

An inspection method using an automatic inspection system comprises the following: (a) a step of loading a 3D file from which the program has been selected; (b) a step of inputting into the program information on one or more selected components of the mold assembly of the 3D file loaded into the program; (c) a step of checking a setting value of the selected component according to a mode selected from a check list preset in the program; and (d) a step wherein, if the set value of the component selected in step (c) is out of the range of the value set in the selected mode, the color of the component out of the range of the set value among the selected one or more components is changed to a preset color and monitored.

7 Claims, 20 Drawing Sheets

SYSTEM FOR AUTOMATICALLY INSPECTING A MOLD DESIGN, AND METHOD USING SUCH (METHOD AND SYSTEM FOR CHECKING A PRESS)

FIELD

The present disclosure relates to a system for automatically inspecting a press design, and provides a system capable of inspecting press setting conditions and of performing safety inspection through various modes during mold design.

INTRODUCTION

Referring to FIG. 1, an inspection method using a conventional mold design and inspection system will be described.

In general, for mold design and inspection, the designer or inspector has reported a standard document documenting the setting conditions of the production press equipment and the safety-related matters of the mold, and has verified the suitability of design data by measuring individual dimensional values.

When performing mold design and inspection using such methods, it has taken a lot of work time and manpower to set the press for verification of design data and to verify safety issues, and there has been a possibility of error in measurement due to manual work such as measuring the dimensions directly, so that there have been cases where the actual mold production has been started with defects included in the design data. If a defect occurs in the actual mold, it takes a lot of cost and time to correct it, and in addition, even if the has been completed, there have been cases where the original standard could not be observed or the safety of the mold itself could not be secured due to the resulting structural changes.

Accordingly, the present applicant has developed an automatic mold design inspection system capable of solving the problems occurring in such a conventional method.

A related patent publication is herein described.

Japanese Patent Publication No. 3405176 relates to an automatic programming device for a plate processing machine; it relates to an automatic programming device for a plate processing machine that sends plate materials back and forth and left and right on a table by a plate material transfer device, and selects various types of punch molds and die mold sets to perform molding processing, and it provides an automatic programming device for a sheet metal processing machine wherein interference can be determined based on the shape, size, and direction of the molding component to be determined by the interference determination means and the mold shape of the adjacent molding component.

However, since a specific check method for safety checking a die and a specific check method for checking a press have not been disclosed, there is a limit to automating the inspection.

SUMMARY

The present disclosure was devised to solve the above-stated problems.

It attempts to solve problems wherein excessive work time and manpower have been required due to measurement for the verification of design data, there has been a possibility of error in measurement due to manual work, and the actual mold production has included defects in the design data.

For solving the above-stated problems, one embodiment of the present disclosure provides an inspection method using an automatic inspection system comprising (a) a step of loading a 3D file from which the program has been selected; (b) a step of inputting into the program information on one or more selected components of the mold assembly of the 3D file loaded into the program; (c) a step of checking a setting value of the selected component according to a mode selected from a check list preset in the program; and (d) a step wherein, if the set value of the component selected in step (c) is out of the range of the value set in the selected mode, the color of the component out of the range of the set value among the selected one or more components is changed to a preset color and monitored.

In addition, it preferably further comprises, after the step (d), (e) a step of providing the monitoring result through a pop-up window; and (f) a step of providing monitoring result values provided through the pop-up window as an Excel file.

In addition, when the mode selected in (c) is the press setting check mode, it is preferable to include a step (c1) of comparing the outermost size of the mold assembly and the press value by a predetermined method.

In addition, in the preset method of (c1), it is preferable to recognize and compare the outermost size of the mold assembly as a hexahedron.

In addition, it is preferable that the mode further comprises a mold die safety check mode.

The present disclosure as described above may have the following effects. Work time and manpower are minimized due to measurement for verification of design data. In addition, manual work is minimized, minimizing the possibility of measurement errors due to manual work. Further, when using the system according to the present disclosure, since the measurement behavior and the determination of whether or not the design data are defective are all automatically performed, it is possible to easily, quickly and accurately detect defective components. Also, confirmation of the test result becomes intuitive and possible. Moreover, the test results can also be provided in the form of an Excel report.

BRIEF DESCRIPTION OF THE DRAWINGS

In FIG. 4a, a result screen is shown of the mold machine setting check mode of the automatic inspection system according to the present disclosure.

DETAILED DESCRIPTION

Hereinafter, an automatic inspection system and an inspection method using the same according to the present disclosure will be described in detail with reference to the drawings.

Here, the components constituting the present disclosure may be used integrally or may be used separately, as necessary. In addition, some components may be omitted depending on the type of use. Various modifications are possible in the form and number of components of the present disclosure.

Inspection Method Using Automatic Inspection System

Figure 1:
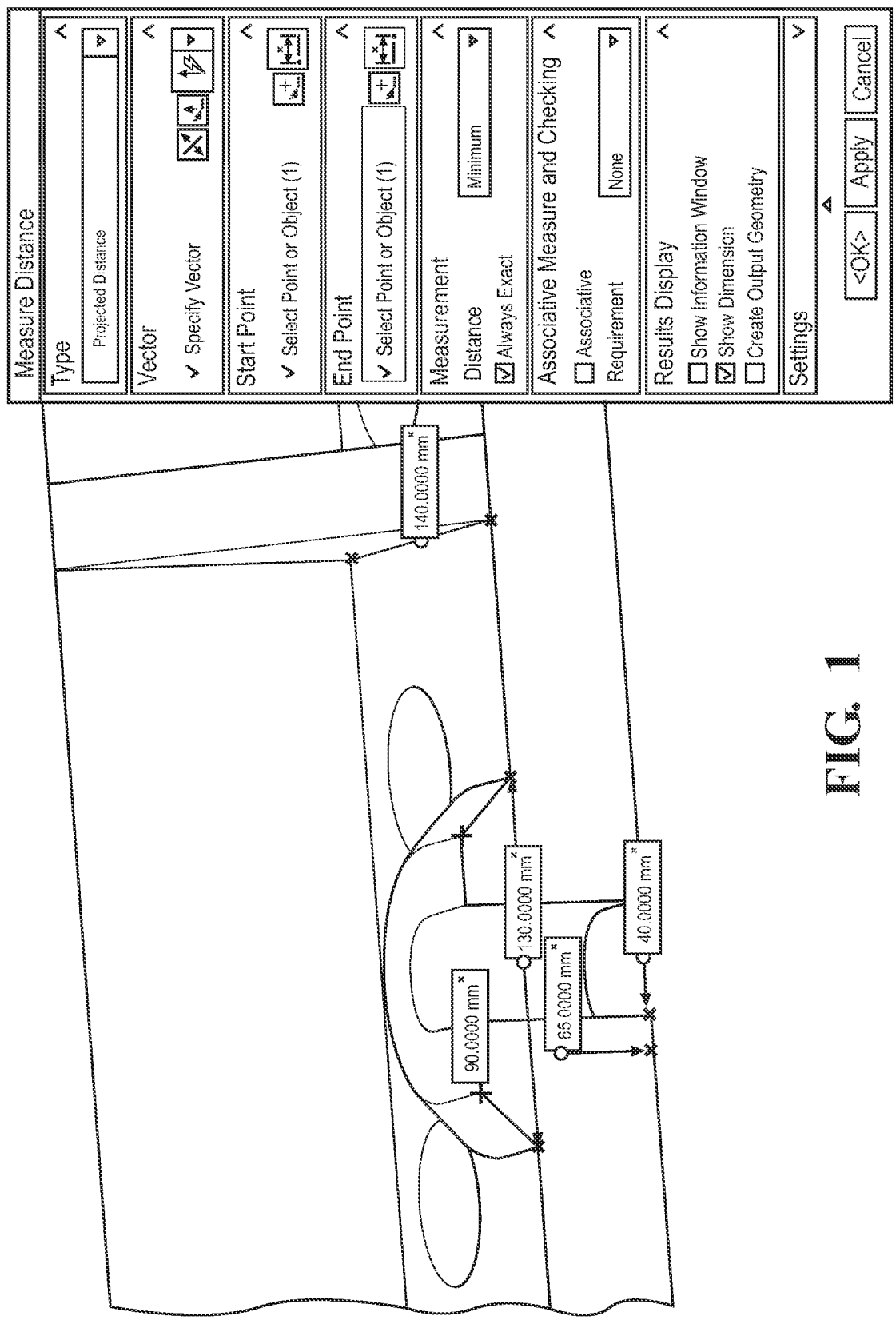
In FIG. 1, a conventional inspection system is shown.
Figure 2:
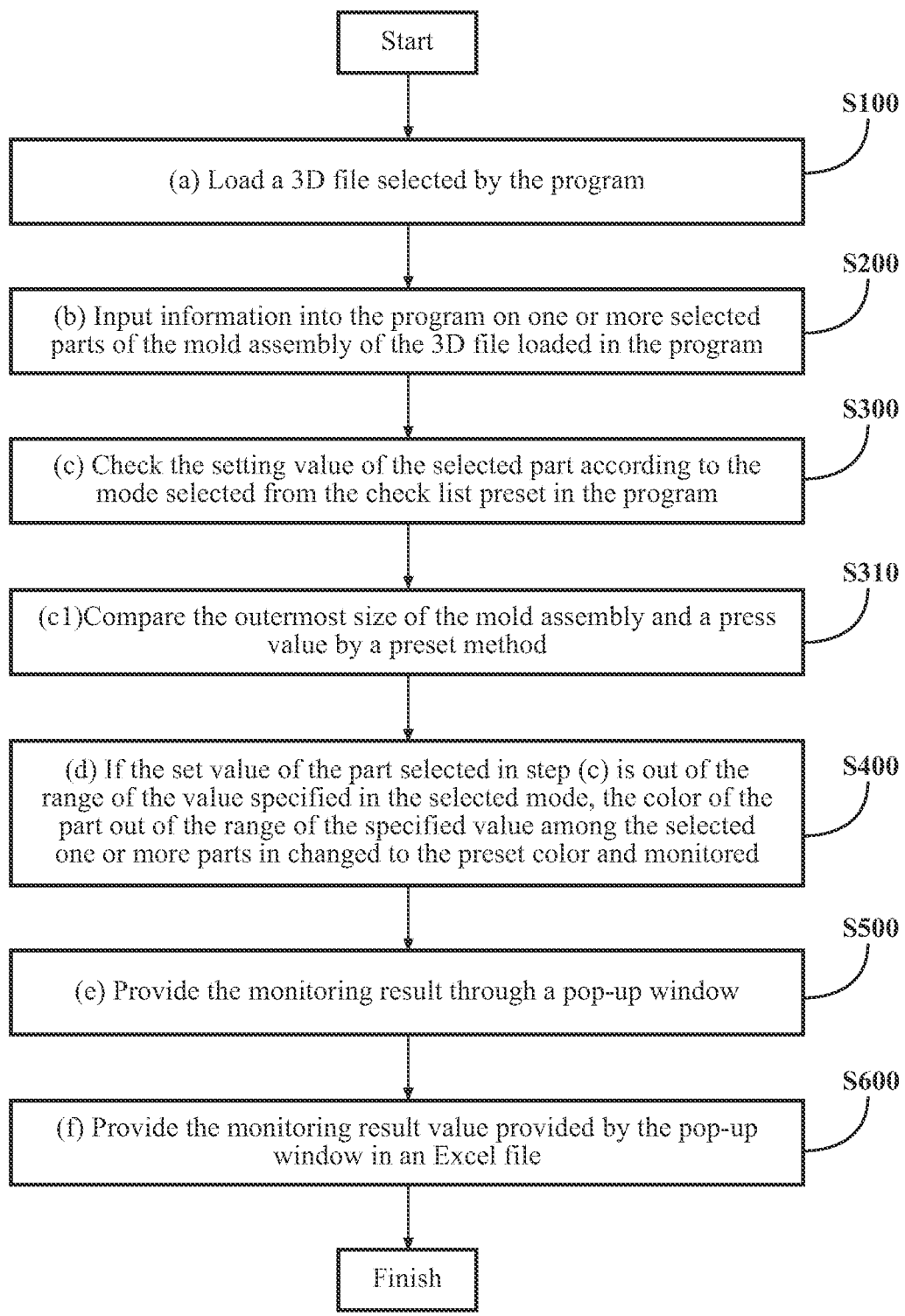
FIG. 2 is a flowchart of an automatic inspection system and a inspection method using the same according to the present disclosure.

Referring to FIG. 2, an inspection method using an automatic inspection system will be described.

The inspection method using the automatic inspection system according to the present disclosure comprises the following steps: a step (S100) of loading a 3D file selected by the program; a step (S200) of inputting information on one or more selected components of the mold assembly of the 3D file loaded in the program into the program; a step (S300) of checking the set value of the selected component according to the selected mode from the check list set in the program; a step (S400) of changing the color of the component out of the range of the predetermined value among the selected one or more components to a preset color and monitoring it, when the set value of the component selected in step S300 is out of the range of the value set in the selected mode; a step (S500) of providing the monitoring result through a pop-up window; and a step (S600) of providing the monitoring result value provided through the pop-up window as an Excel spreadsheet (S600).

First, a step (S100) of loading a 3D file from which a program is selected is performed. At this time, the program is a program that is capable of implementing the inspection system according to the present invention; preferably, it operates with the concept of Tool Kit developed in UG NX (basic CAD SW).

Next, a step (S200) is performed of inputting in the program information on one or more selected components of the mold assembly of the 3D file loaded into the program. At this time, one or more selected components are selected by the user.

Next, a step (S300) is performed of checking a setting value of a selected component according to a mode selected from a check list preset in the program. Modes provided in the automatic inspection system according to the present invention include a mold machine setting check mode and a die safety check mode.

If the mode selected in step S300 is the press setting check mode, a step (S310) of comparing the outermost size of the mold assembly and the press value in a predetermined method is further performed. At this time, the predetermined method of step S310 serves to recognize and compare the outermost size of the mold assembly as a cube. In addition, a detailed description of the modes will be described in the mode description section to be described later.

When the set value of the component selected in step S300 is out of the range of the set value in the selected mode, a step (S400) is performed of changing the color of the component out of the range of the predetermined value among the selected one or more components to a preset color, and monitoring it. In the preferred embodiment, the color of the component selected is green, and the color of the component outside the range is shown in red.

Next, a step (S500) of providing the monitoring result through a pop-up window is performed. By providing specific errors through a pop-up window, the operator can intuitively perform confirmation.

Next, a step (S600) of providing the monitoring result value provided through the pop-up window as an Excel file is performed. If the user's additional input is confirmed in step S500, step S600 will be performed. Accordingly, the operator can easily render the inspection result in paper form.

Program Execution Screen Description

Figure 3:
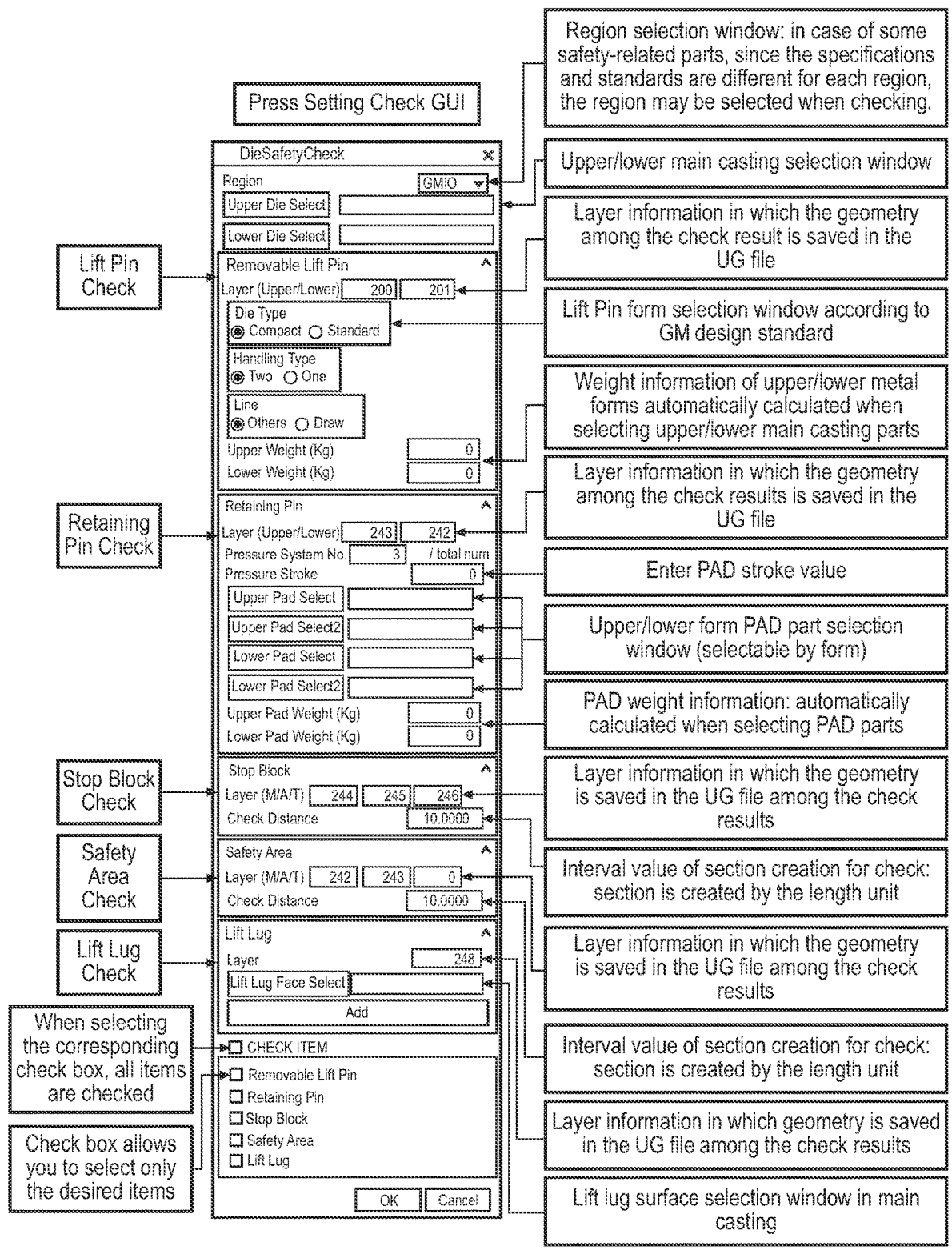
In FIG. 3, a GUI is shown of an automatic inspection system according to the present disclosure.
Figure 4B:
In FIG. 4b, a result screen is shown of the mold die safety check mode of the automatic inspection system according to the present disclosure.
Figure 5:
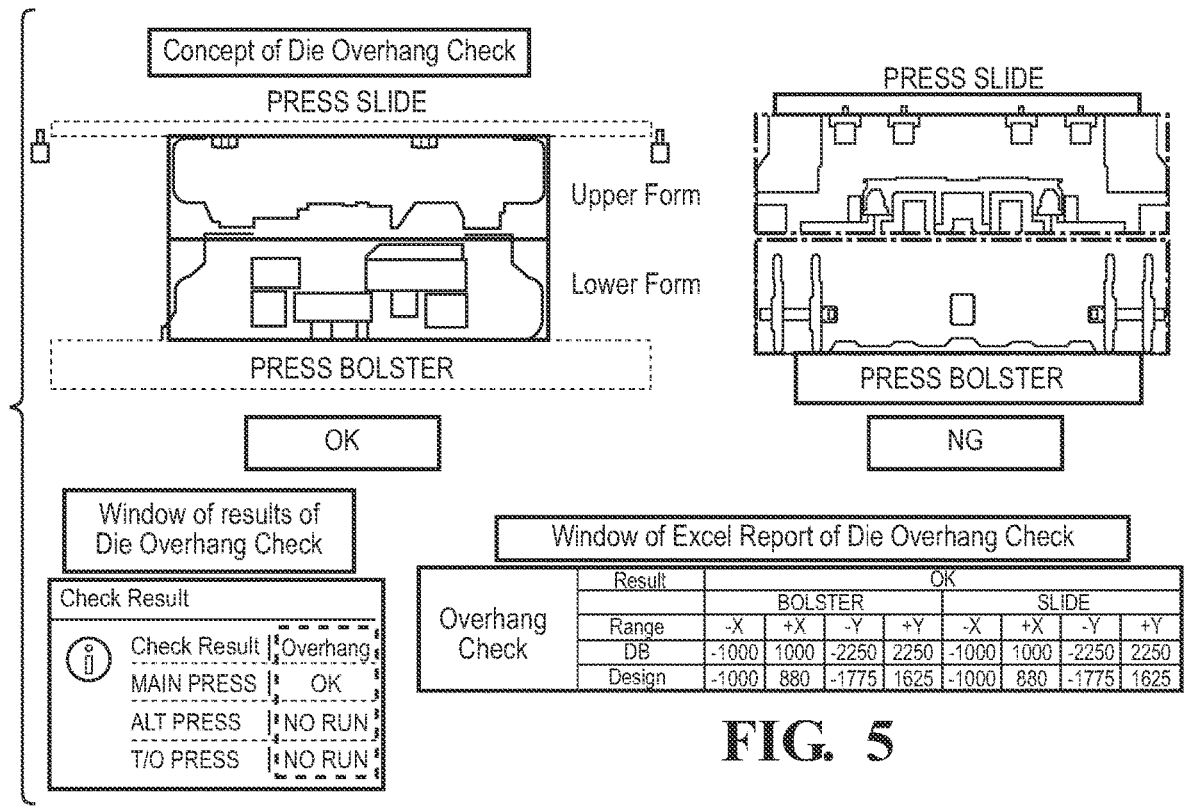
In FIG. 5 a case is shown of a die overhang check when a mode is executed of the automatic inspection system according to the present disclosure.

FIG. 3 shows an execution screen of the program before mode selection. First, the mold design data (3D file) is opened and then the mold machine setting check mode is executed. Next, the top/bottom main casting component selection and other detailed options (press information, etc.) are set and the OK button is pressed to run the check program. At this time, it is possible to select any one or more of the three press types: Main/Alt/Tryout; all three presses can be selected and executed at the user's convenience. The 9 check items of the mold machine setting check mode can also be checked by selecting all items or selecting only the desired items according to the user's convenience. If the check result comprising the interference check item or location information among the check results is displayed in documents, etc., individual items can be provided on multiple layers.

Mode Description

As mentioned, the program comprising the mold inspection system according to the present disclosure provides a mold machine setting check mode and a die safety check mode. Detailed check items of each mode will be described with reference to FIGS. 4a to 18d.

1. Mold Machine Setting Check Mode (Press Setting Check)

1) Die Overhang Check

The die overhang check items will be described with reference to FIGS. 4a, 4b, 5, and 18a-18d. By comparing the outermost size of the tool and the size of the allowable space for each press, confirmation is performed regarding whether setting is possible without constraints in the press. Specifically, by recognizing the outermost part of the mold, a random box (hexahedron) having the maximum value in the X and Y directions is created, the size of the box is compared with the maximum allowable standard value in the X and Y directions for each press line, and if the size of the maximum box is smaller than the maximum value of the press, it is determined as OK, and if it is large, it is determined as NG. If the check result is displayed in the pop-up window, the presence or absence of OK or NG is displayed, and it is provided to Excel by user input, then on the Excel report, the standard coordinate value (maximum allowable value) of the press line is displayed in the DB item, and the measured coordinate value of the box created from the actual mold data is indicated in the design item. In the method of marking the check result, check items to be described later are also marked in the same way.

2) Die Set Height Check

Figure 6:
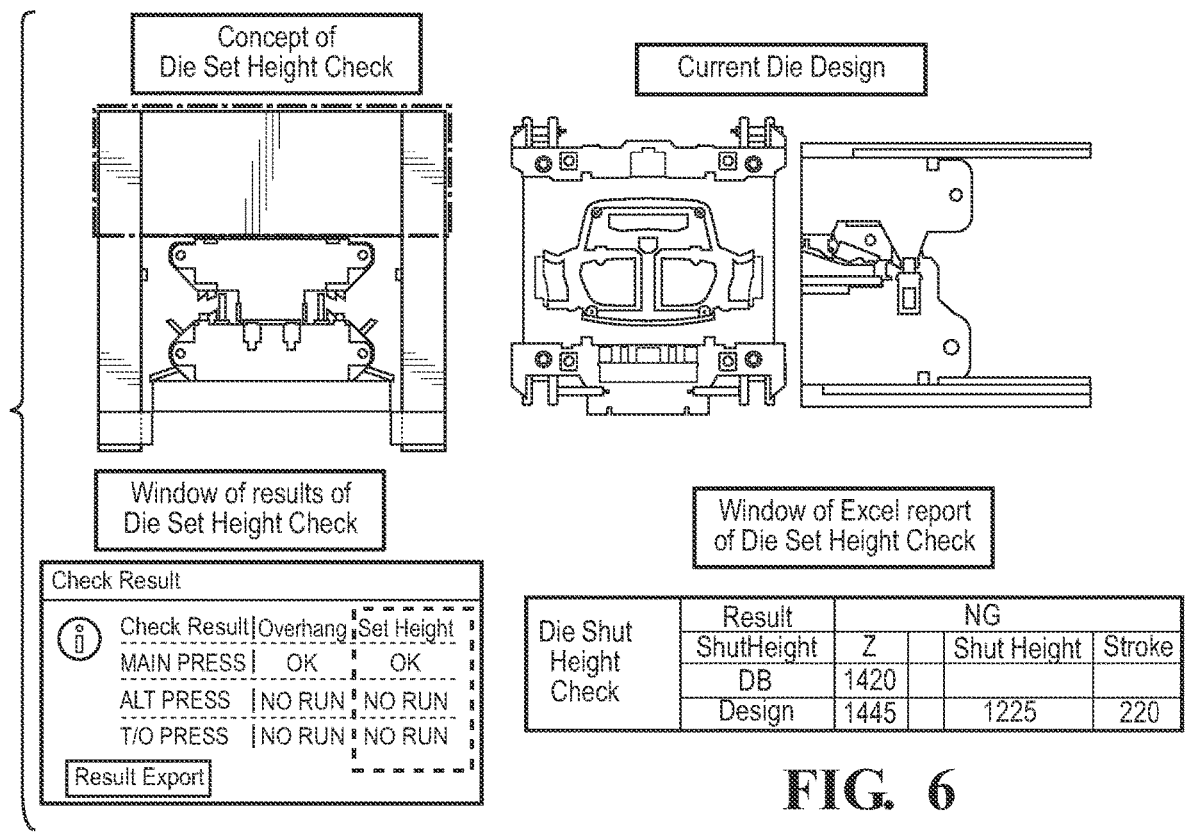
In FIG. 6, a case is shown of a die set height check when executing a mode of the automatic inspection system according to the present disclosure.

The die set height check item will be described with reference to FIG. 6. The die set height check serves to check whether the height value in the loaded state of the tool according to the design specification is designed to fit the allowable height value determined for each press.

In order for the die set height, that is, the height in the stacked state, to prevent the upper/lower working parts from interlocking with each other in a mold structure consisting of a normally constituted upper/lower mold, a gas spring is installed to support the weight of the upper mold; this refers to the height of the upper mold lifted to the extent of the stroke of the gas spring.

Hereinafter, an equation for obtaining the die set height is disclosed.

Stacked height=Bottom dead center state (Mold height at the point of completion of operation)+ Gas Spring Stroke length　　(Formula 1)

Specifically, by recognizing the lowest point and the highest point of the mold, the height value is confirmed in the Z direction in the state of the bottom dead center, and the gas spring applied as the storage block within the design data is searched to confirm the stroke value of the part. The two values are summed to calculate the die set height value in the design specification, the value is compared with the allowable height value for each press line, and if the corresponding die set height value is less than the allowable value of the press, it is determined as OK, and if it is large, it is determined as NG.

3) Die Shut Height Check

Figure 7:
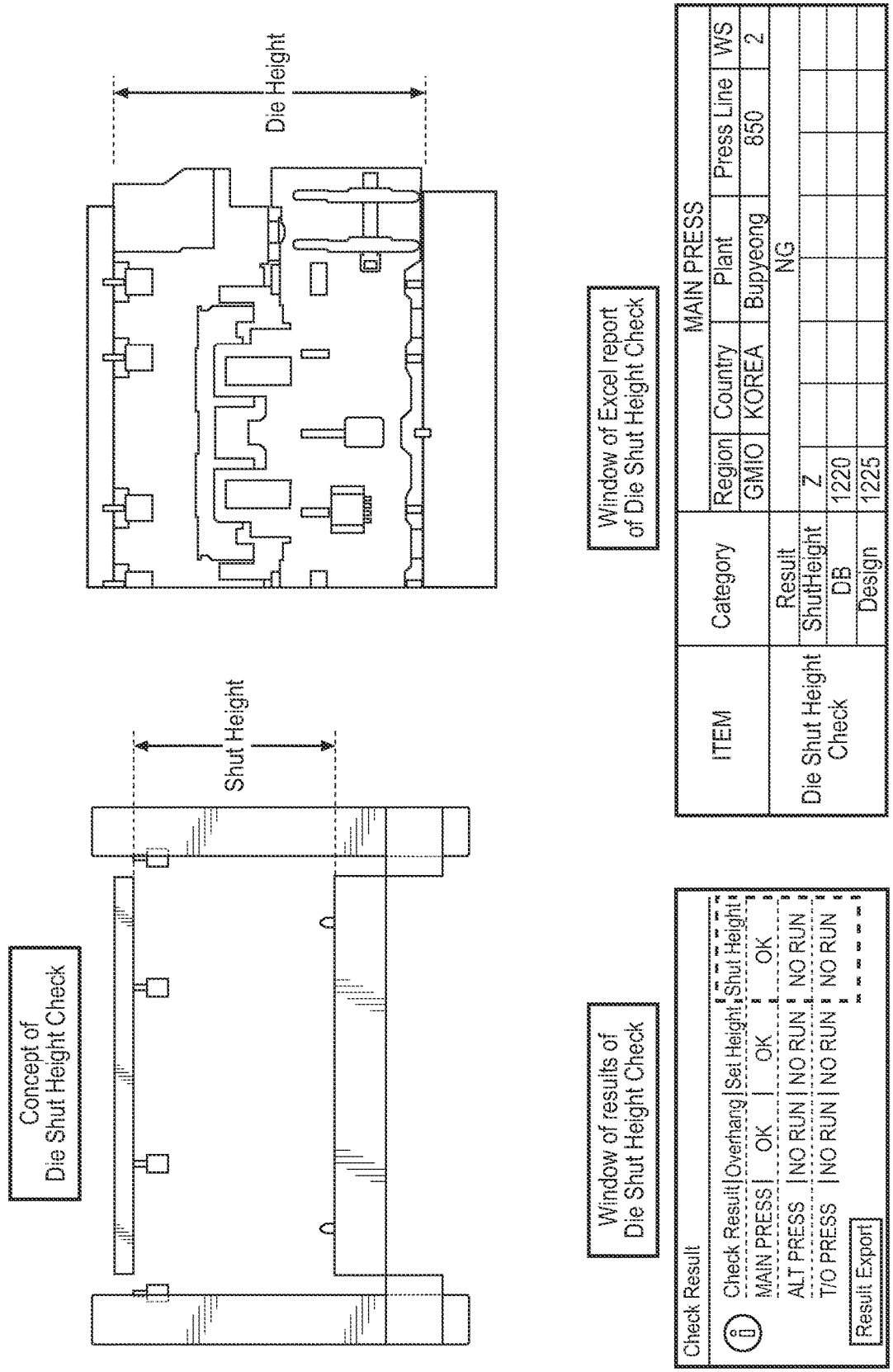
In FIG. 7, a case is shown of a die shut height check when executing a mode of the automatic inspection system according to the present disclosure.

The die shut height check item will be described with reference to FIG. 7. The Die Shut Height Check is the height value between the lowest point and the highest point of the mold according to the design specification; it serves to confirm whether it is designed according to the standard height value set for each press. Specifically, by recognizing the lowest and highest points of the mold the height value in the Z direction is confirmed, the Z direction standard values for each press line are compared, and if the two values match, it is determined as OK, and if not, it is determined as NG.

4) Draw Cushion Pin Collision Check

Figure 8:
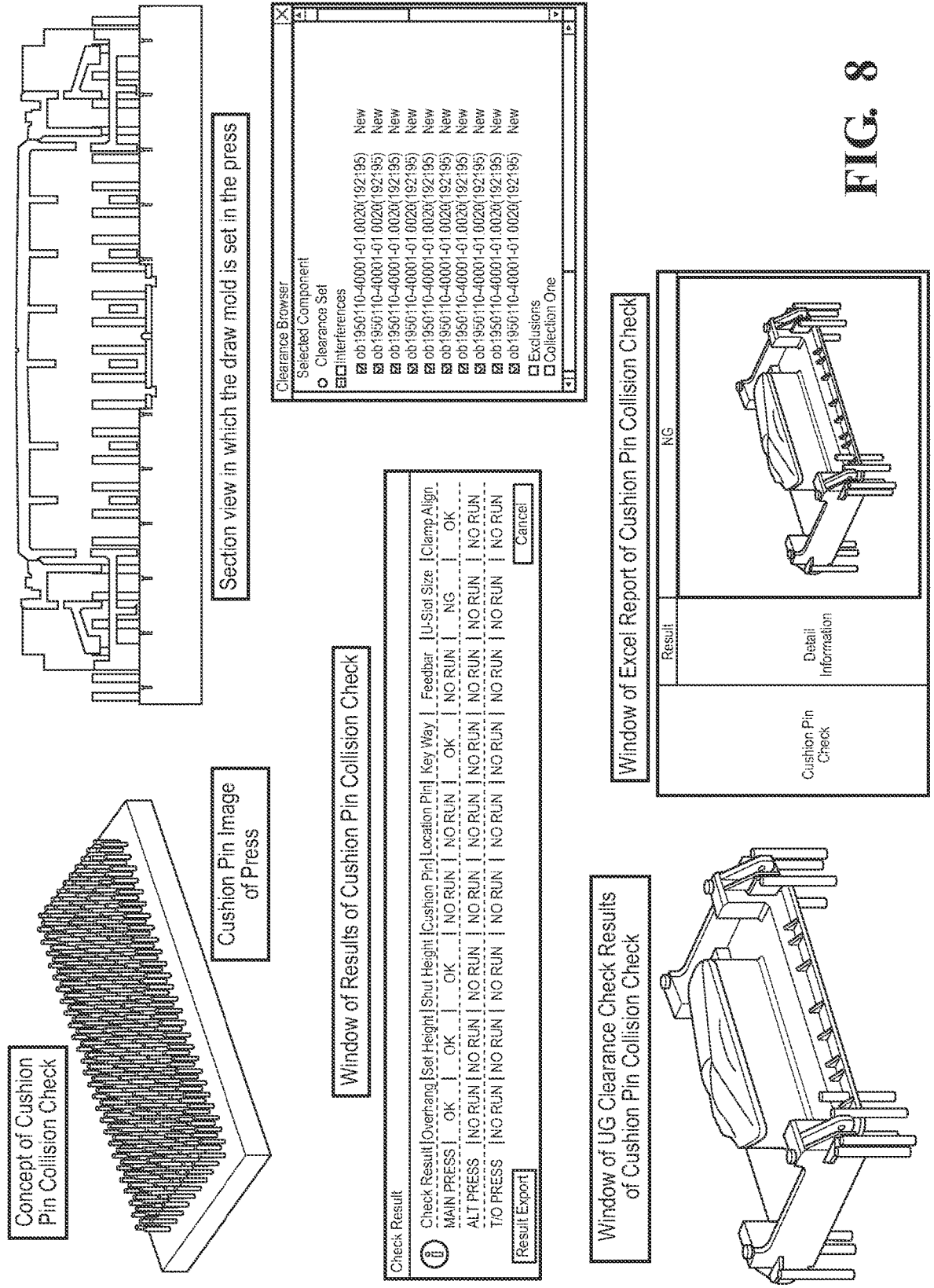
In FIG. 8, a case is shown of a cushion pin check when executing a mode of the automatic inspection system according to the present disclosure.

The cushion pin check item will be described with reference to FIG. 8. In the case of the draw process that actually forms the product, in the press equipment, a pressure source generated from the lower bolster rather than the pressure generated from the upper slide is required, and a device called a cushion pin is usually used as the corresponding pressure source. The lower mold of the draw process can operate normally without interference with the corresponding cushion pin; in the conventional method, the mold design data has had to be opened and viewed in a section view by a certain unit to check for interference. A program implemented by the inspection system according to the present invention can automatically verify whether there is interference.

Specifically, in the design data, after searching for an assembly object that has a designated naming (Main Press: mphic, Alt Press: aphic, Tryout Press: tphic), a solid body is generated that adds a clearance value for interference verification to the object. Interference verification is performed on the solid body and mold through clearance check, which is a basic function of UG NX. As a result of the verification, if there is no interference, it is determined as OK, and if interference occurs, it is determined as NG. At this time, the check result is further provided to visually check detailed information of the portion where the actual interference has occurred.

5) Location Pin Check

Figure 9:
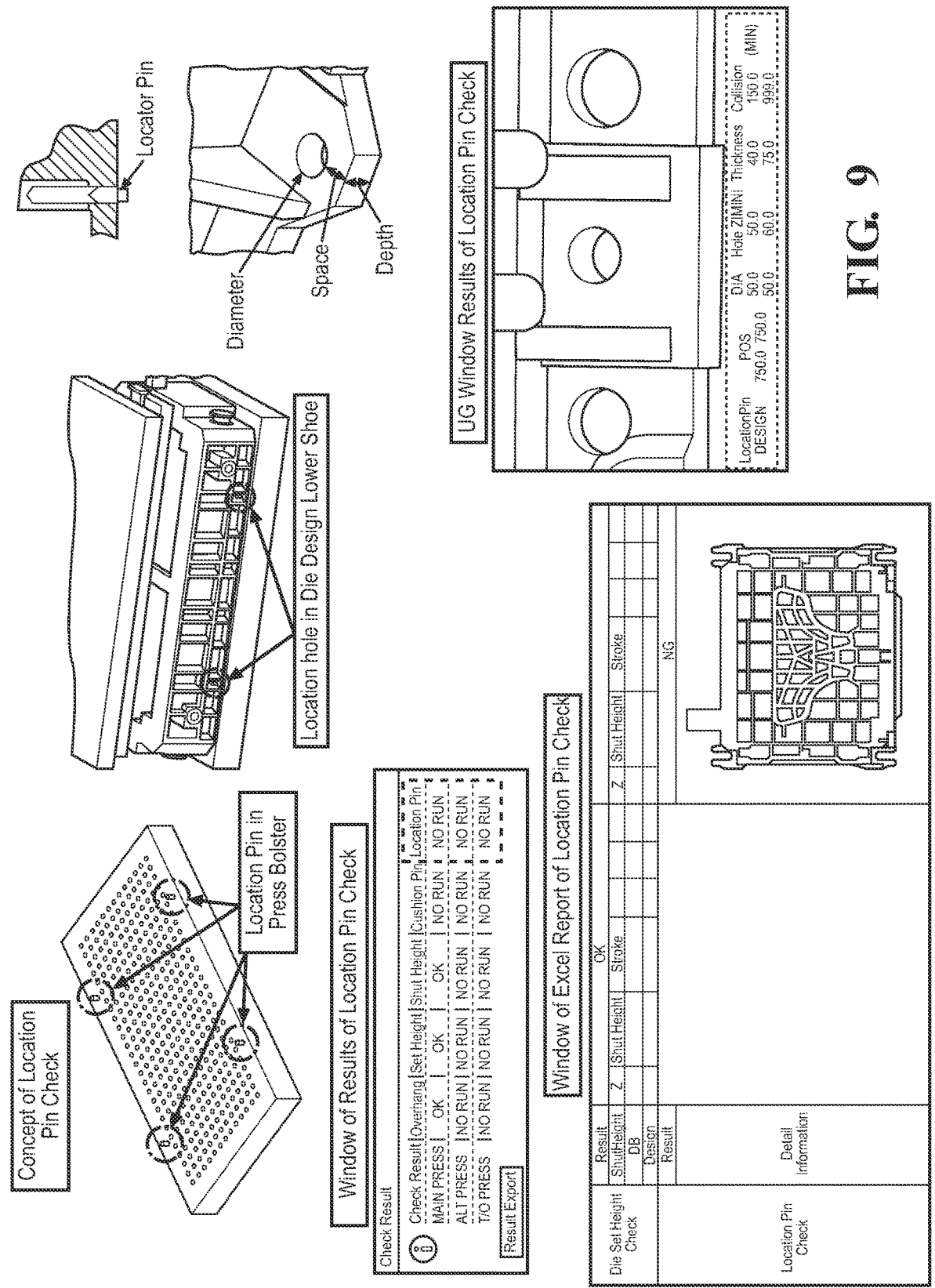
In FIG. 9, a case is shown of a location pin check when executing a mode of the automatic inspection system according to the present disclosure.

The pin position check item will be described with reference to FIG. 9. In order to accurately set the mold in the lifted state by the crane to the position on the design specification on the bolster of the press, a protruding pin structure is applied to the press facility, and on the mold side, a hole structure is applied to enable setting through the corresponding pin; this serves to confirm whether the location information of the corresponding hole matches the value of the press standard, and whether the hole structure design is designed according to the standards (hole size, depth value, mold thickness value, etc.).

Specifically, within the design data the property object marked "Alignment Hole" is searched, and then among the objects, a location pin hole that satisfies the specified constraints (higher assembly object conditions and height values including the object) is searched. The coordinate value, diameter value, depth value, and peripheral thickness of the hole are compared with the standard values of the press, and if they match, it is determined as OK, and if not, it is determined as NG.

6) Key Way Check (Not Shown)

Key parts are used to set the mold in the correct position of the bolster of the press or the processing bed during the manufacture of the mold or the production of the finished mold; on the mold side, a structure corresponding to the key component is applied. The dimension value of the structural unit is designed to match the standard value in the specifications of each equipment item, so that there are no problems with the setting.

Specifically, after searching for a property object marked "Key way" in the design data, division is performed into an upper-type key way/lower-type key way through the specified constraints (the condition of the parent assembly object including the object and the height value) among the objects.

Each searched key way is measured by measuring each measurement item based on the center of the object and comparing the measured value with the standard value of the press, and if it matches, it is determined as OK, if not, it is determined as NG.

7) Transfer Feed Bar Rail Collision Check

Figure 10:
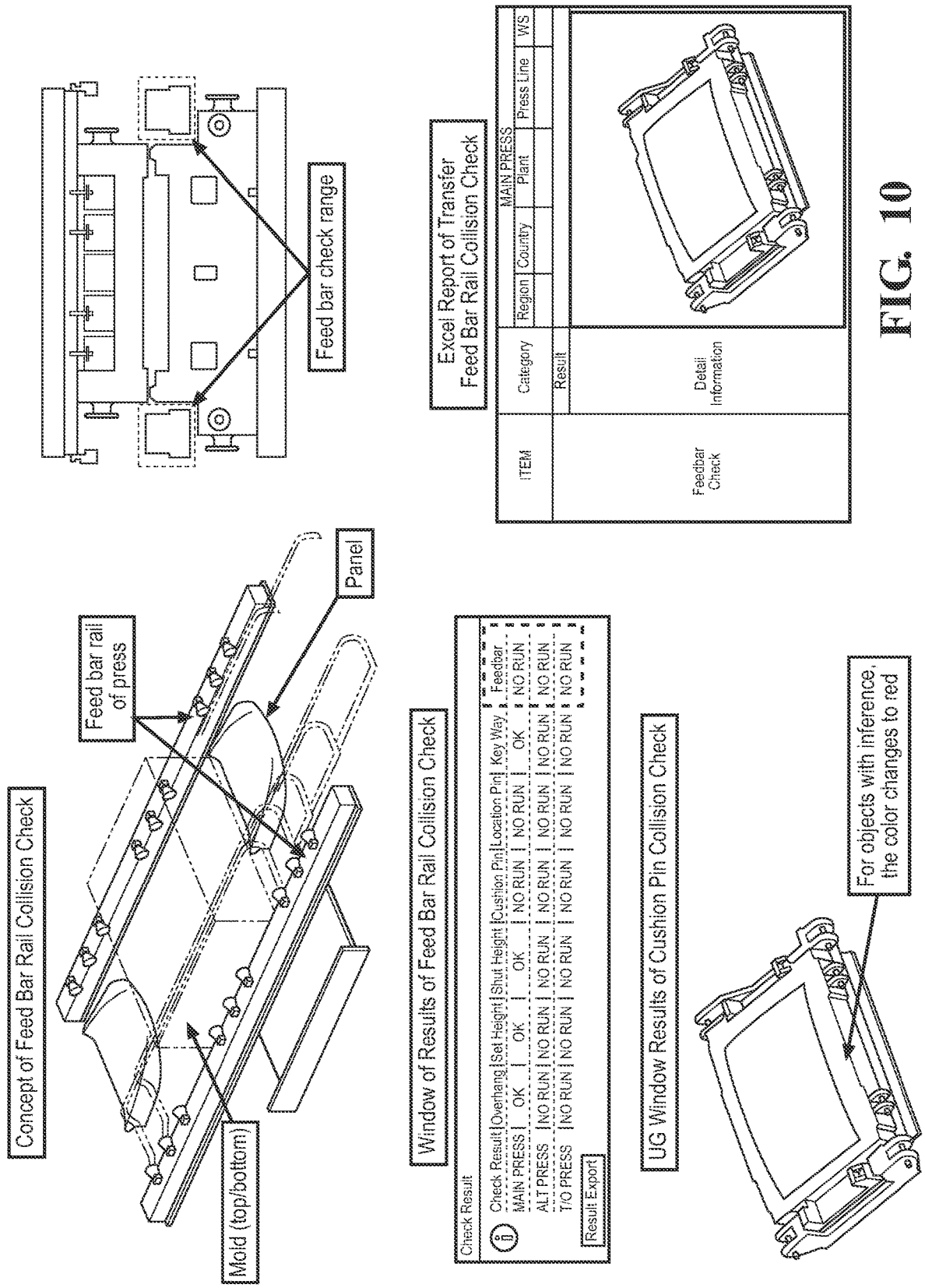
In FIG. 10, a case is shown of a transfer feed bar rail collision check when executing a mode of an automatic inspection system according to the present disclosure is shown.

A feed bar interference check item will be described with reference to FIG. 10. In the case of Tri-Axis Press, panel transfer between each process is carried out by a device called a feed bar; this is a program that verifies whether there is interference with the feed bar when the mold is set on the press for production or during production.

Specifically, a solid for interference check is generated by comprising a clearance value from the DB in which the specifications of the feed bar rail are arranged for each press line. The created solid and mold top/bottom are checked using the Intersection function, a function of UG NX; if there is no interference as a result, it is determined as OK, and if interference occurs, it is determined as NG.

8) U-Clamp Dimension Check

Figure 11:
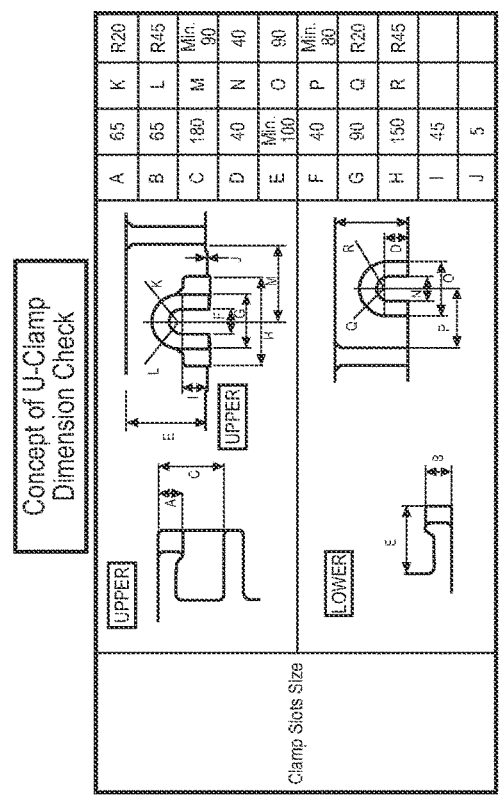
In FIG. 11, a case is shown of a clamp dimension check (U-Clamp Dimension Check) when executing a mode of the automatic inspection system according to the present disclosure.
Figure 11:
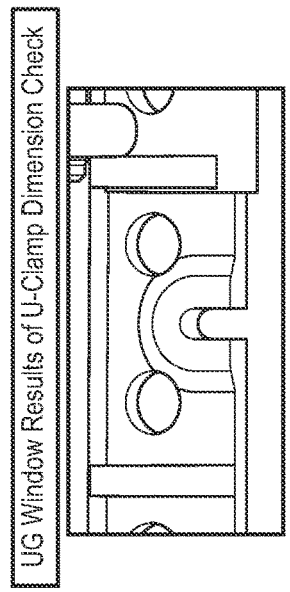
Figure 11:
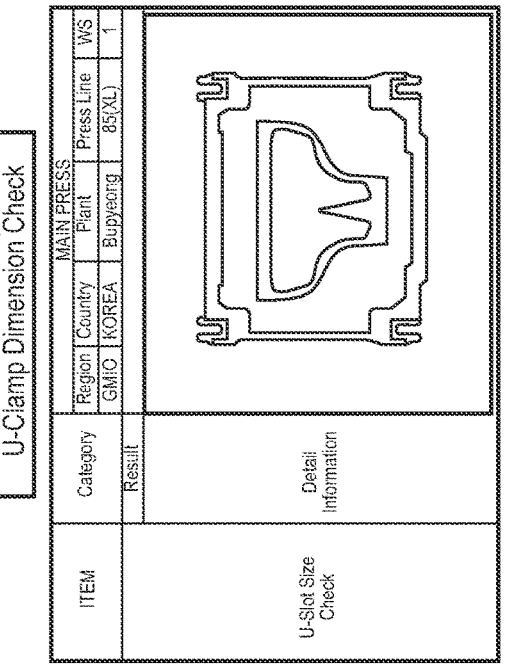

The clamp dimension check item will be described with reference to FIG. 11. When setting the mold, clamps are used to fix the mold to the upper/lower (Slide/Bolster) structure of the press; on the mold side, a structure corresponding to the clamp is applied. This serves to confirm whether there is a problem with the setting because the location value of the structure is designed to match the standard value in the press facility specification.

Specifically, after searching for a property object marked "Press Clamping Slot" in the design data, it is classified among the objects into upper clamping slot/lower clamping slot through a set constraint (higher assembly object condition and height value including the object), each searched clamping slot is measured based on the center of a circle object, and the measured value is compared with the standard value of the press; if it matches, it is determined as OK, and if not, it is determined as NG.

9) Press Clamp Alignment Check

Figure 12:
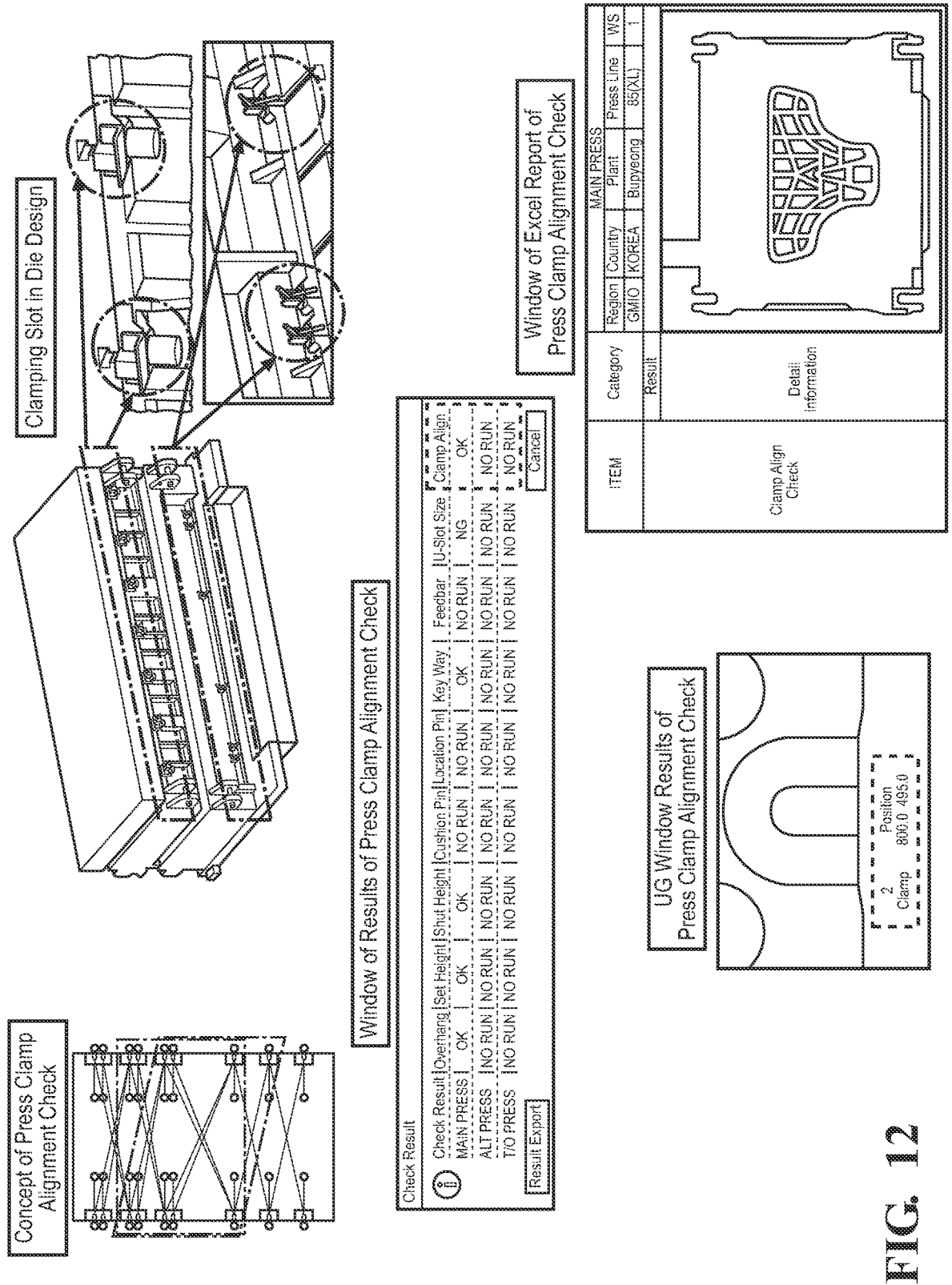
In FIG. 12, a case is shown of a clamp position check (Press Clamp Alignment Check) when executing a mode of the automatic inspection system according to the present disclosure.

The clamp position check items will be described with reference to FIG. 12. This serves to confirm whether there is any problem in setting because the position value of the structure is designed to match the clamp position value on the press facility specification.

Specifically, after searching for an attribute object marked "Press Clamping Slot" in the design data, it is classified among the objects into upper clamping slot/lower clamping slot through a set constraint (higher assembly object condition and height value including the object), and it compares the coordinate value of each searched clamping slot with the standard value of the press; if it matches, it is determined as OK, and if not, it is determined as NG.

2. Die Safety Check Mode

1) Lift Pin Check

Figure 13:
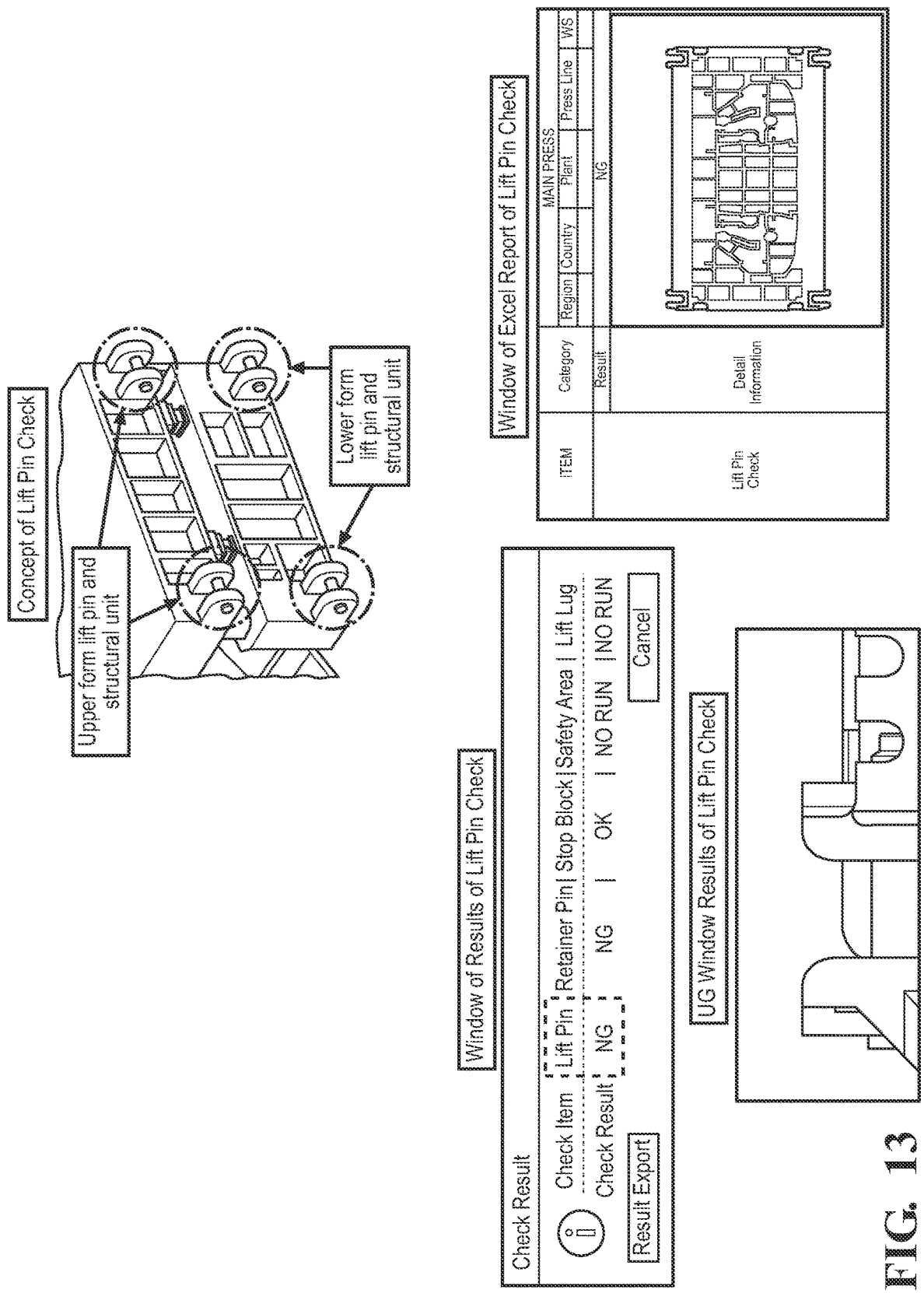
In FIG. 13, a case is shown of a lift pin check when executing a mode of the automatic inspection system according to the present disclosure In FIG. 14, a case is shown of a retaining pin check when executing a mode of the automatic inspection system according to the present disclosure In FIG. 15, a case is shown of a stop block check when executing a mode of the automatic inspection system according to the present disclosure.

The lift pin check items will be described with reference to FIG. 13. Structures and parts are required for handling basic mold lifting and turnover; the most common way is to apply a lift pin. This automatically verifies that the specifications of the lift pin applied to the mold are sufficient to handle the weight of the mold and that the structural design is designed to the standard.

Specifically, after searching for an object containing a technology called "Lift Pin" in the design data, measurement items of each structural part are measured based on the center line of the object. Separately, the automatically measured total weight of the mold is compared with the allowable weight standard of the corresponding lift pin. If the measured values of the structural part are consistent with the standard, and the total weight of the mold is small compared to the allowable weight of the lift pin, it is determined as OK, and if either of the two conditions (structure and allowable weight) is not satisfied, it is determined as NG.

2) Retaining Pin Check

Figure 14:
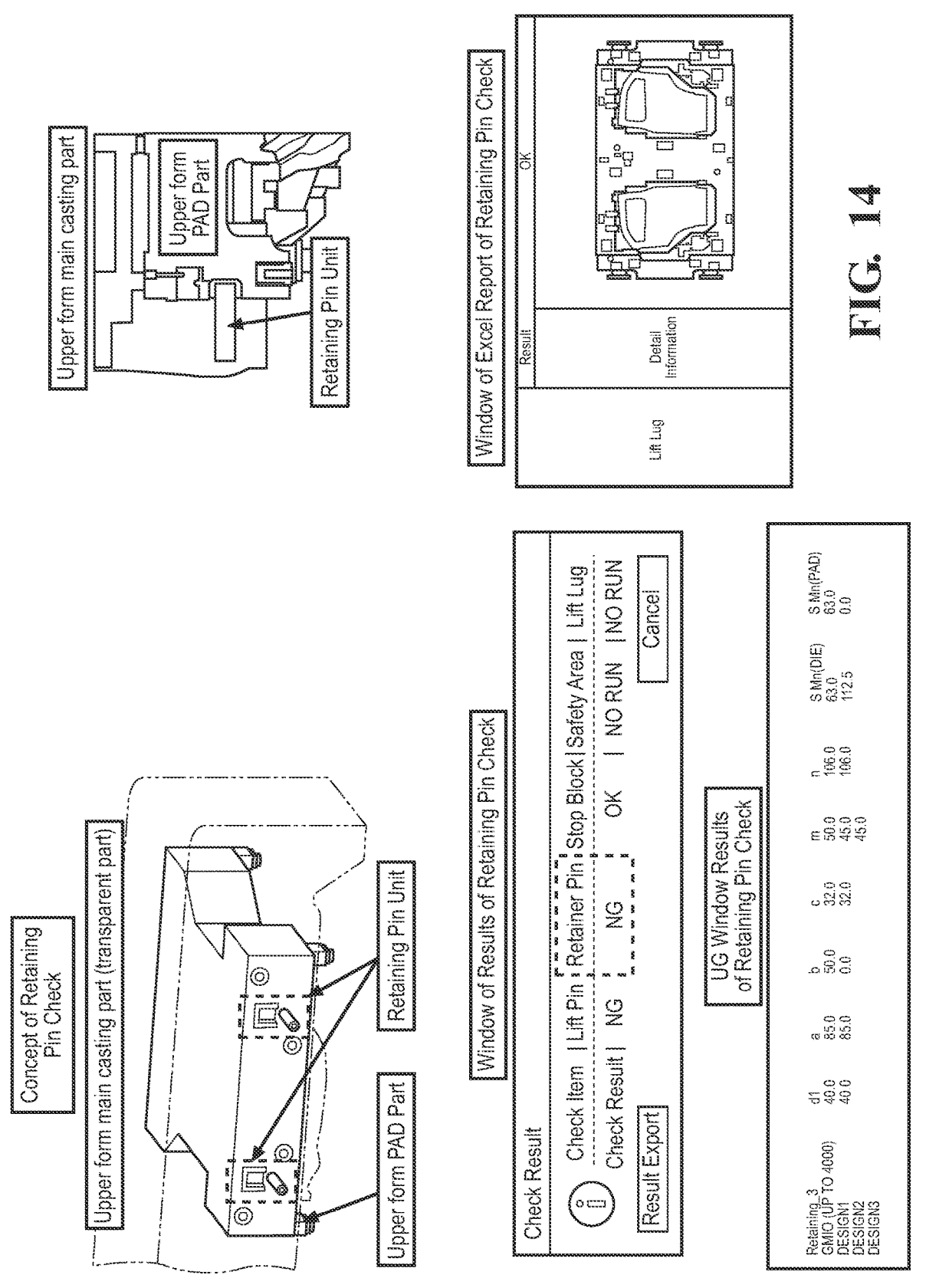

The retaining pin check items will be described with reference to FIG. 14. In the basic mold structure, there are parts that are not fixed within the upper/lower mold and are movable for panel molding; in the case of the high weight, high volume pad parts among the parts, in order to prevent accidents in which structural parts are damaged during operation or are separated from the mold due to unexpected defects, parts and structures called retaining pins are applied between fixed parts and moving parts. This check serves to automatically verify that the specifications of the retaining pin applied to the mold are sufficient to support the weight of the pad and that the structural design is designed according to the standard.

Specifically, after searching for an object containing a technology called "Retaining Pin" in the design data, measurement items of each structural unit are measured based on the center line of the object. Separately, the automatically measured total weight of the pad is compared to the allowable weight standard of the corresponding retaining pin. If the measured values of the structural part match the standard, and the total weight of the mold is small compared to the allowable weight of the retaining pin, it is determined as OK, and if either of the two conditions (structure and allowable weight) is not satisfied, it is determined as NG.

3) Stop Block Check

Figure 15:
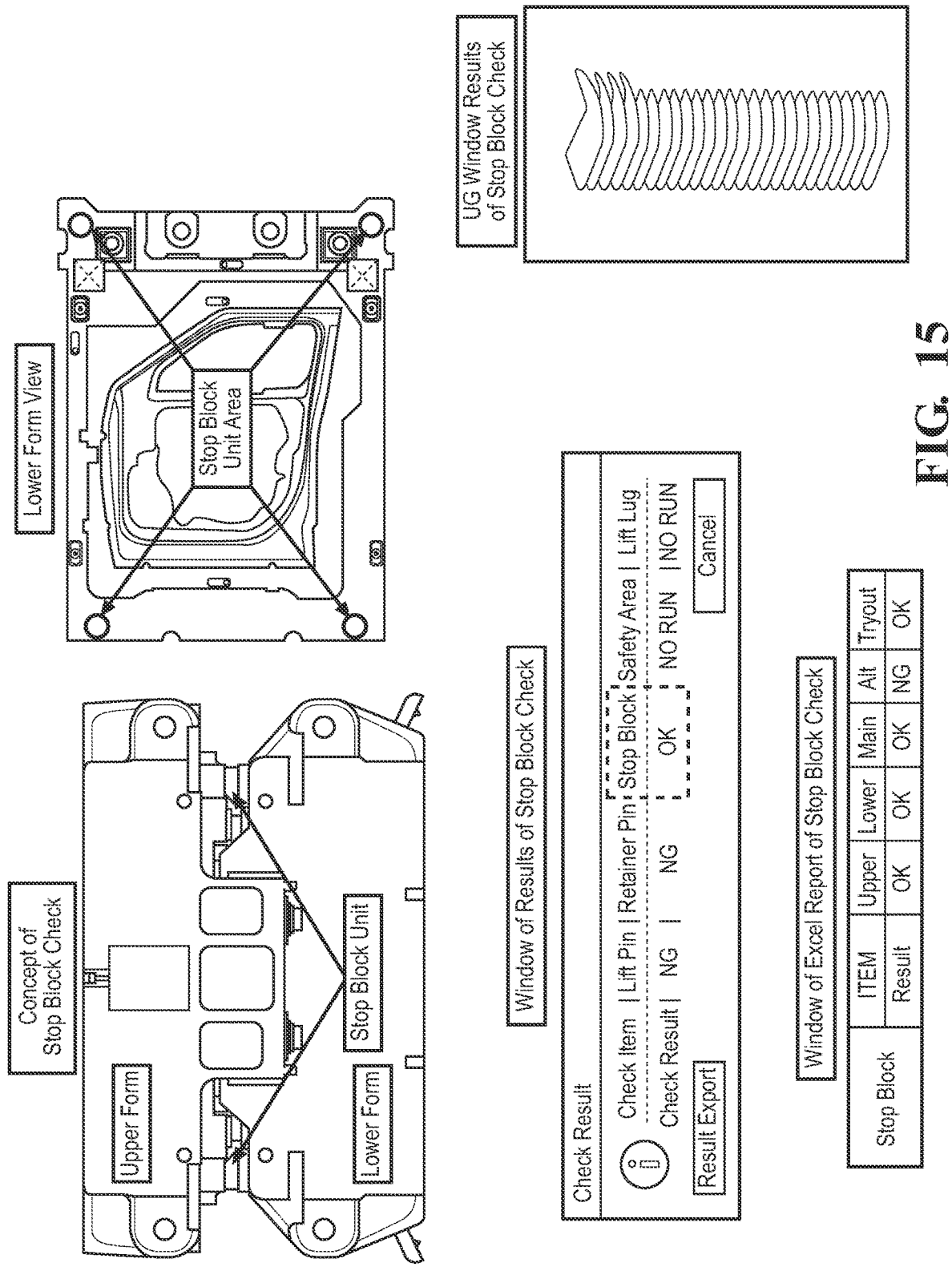

The stop block check item will be described with reference to FIG. 15. In the mold structure, there is a part called Stop Block that is actually in contact between the upper and lower molds excluding the molded unit (the portion formed along the panel shape). The upper/lower mold structure that penetrates the part in the height direction must be filled with at least 60% of the part area. This program can automatically verify whether the conditions for satisfying the upper/lower area of the mold are met.

Specifically, after searching for an object containing a technology called "Stop Block" within the design data, based on the area value of the object (the part is circular, so it is the diameter value), a cylinder with the highest point-lowest point of the mold is generated as the height value. By Boolean operation on the cylinder object and the mold body, an Intersection Body is generated, and a section is generated on the body object in units of a certain length. If there is a section that is 60% or less of the stop block planarity value among the generated sections, it is determined as NG, and if all section entities are 60% or more of the stop block planarity value, it is determined as OK.

4) Safety Area Check

Figure 16:
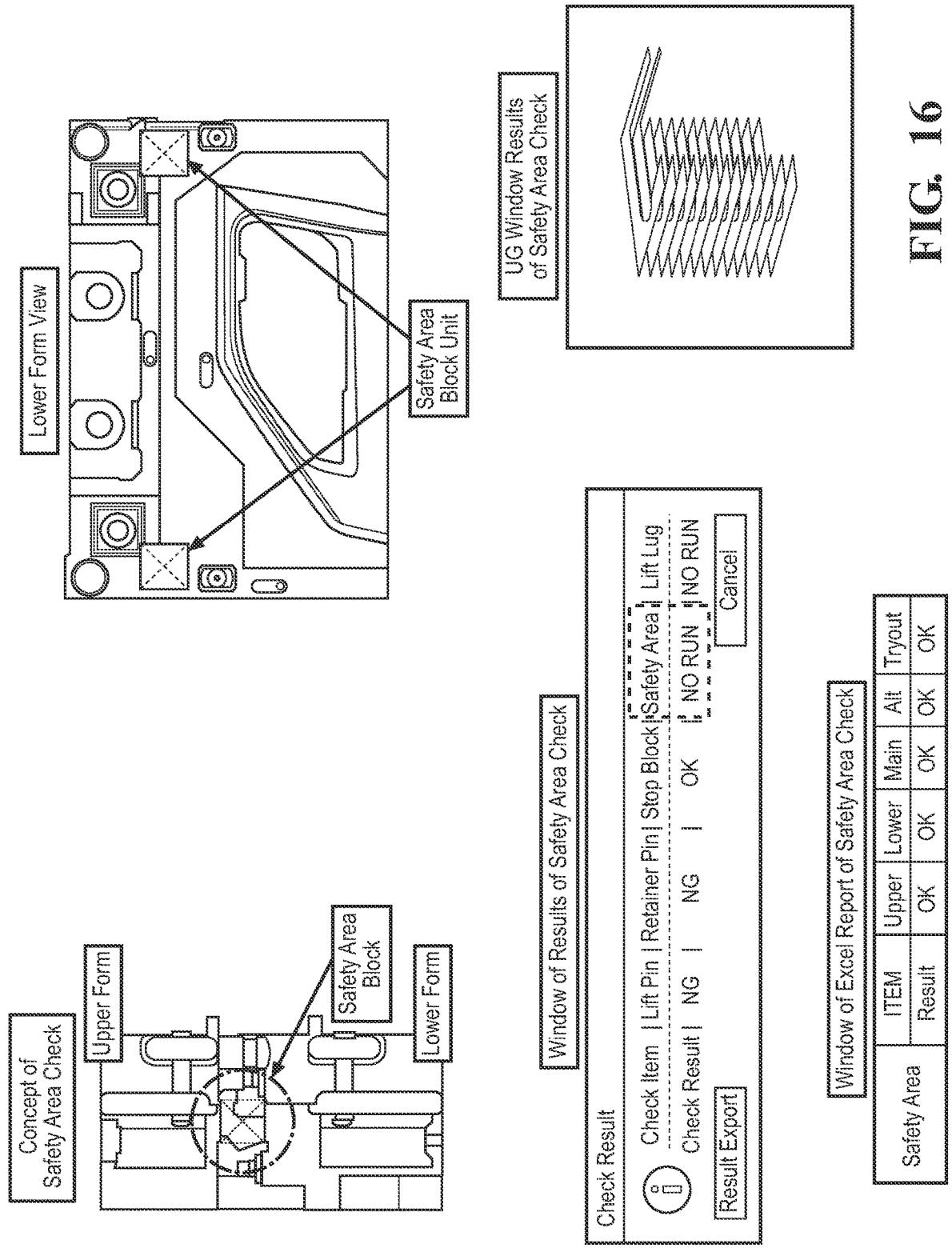
In FIG. 16, a case is shown of a safety area check when executing a mode of the automatic inspection system according to the present disclosure.

The safety area check items will be described with reference to FIG. 16. In order to prevent damage to the mold during the production or manufacturing of the mold and to ensure the safety of workers, a safety block is set on the plane called the safety area, so that even if the upper mold falls due to an accident or damage, It prevents the mold from being completely confined; according to the standard, the structural part must be filled with castings of at least 50% of the area of the part on both the top and bottom sides in the height direction. This check is capable of automatically verifying whether the conditions for satisfying the upper/lower area of the mold are met.

Specifically, after searching for an object containing a technology called "Safety Block" in the design data, a block having the highest point-lowest point of the mold is generated as a height value based on the area value of the object. An intersection body is generated by Boolean operation of the block object and the mold body, and a section is generated with the body object in a certain length unit. If there is a section that is 50% or less of the safe block plane value among the generated sections, it is determined as NG, and if all section entities are 50% or more of the safe block plane value, it is determined as OK.

5) Lift Lug Check

Figure 17:
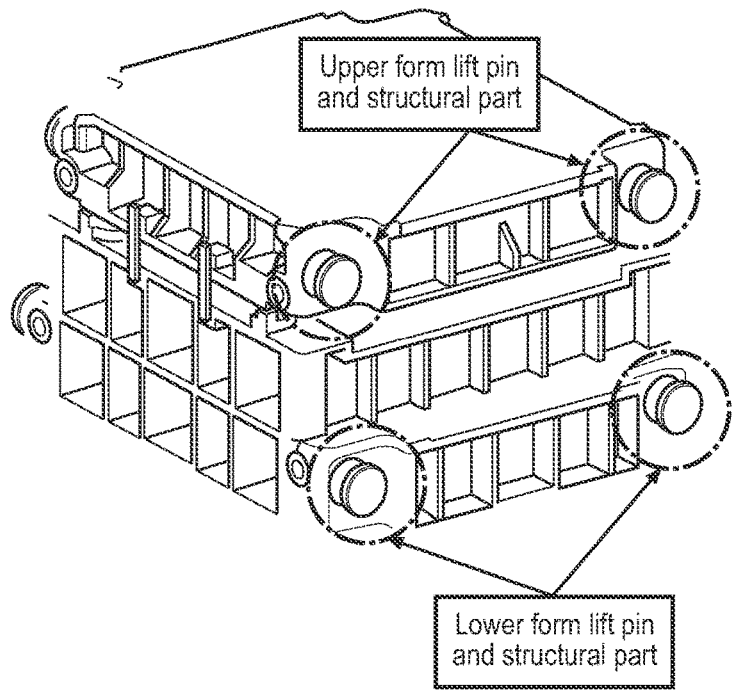
In FIG. 17, a case is shown of a lift lug check when executing a mode of the automatic inspection system according to the present disclosure.
Figure 18A:
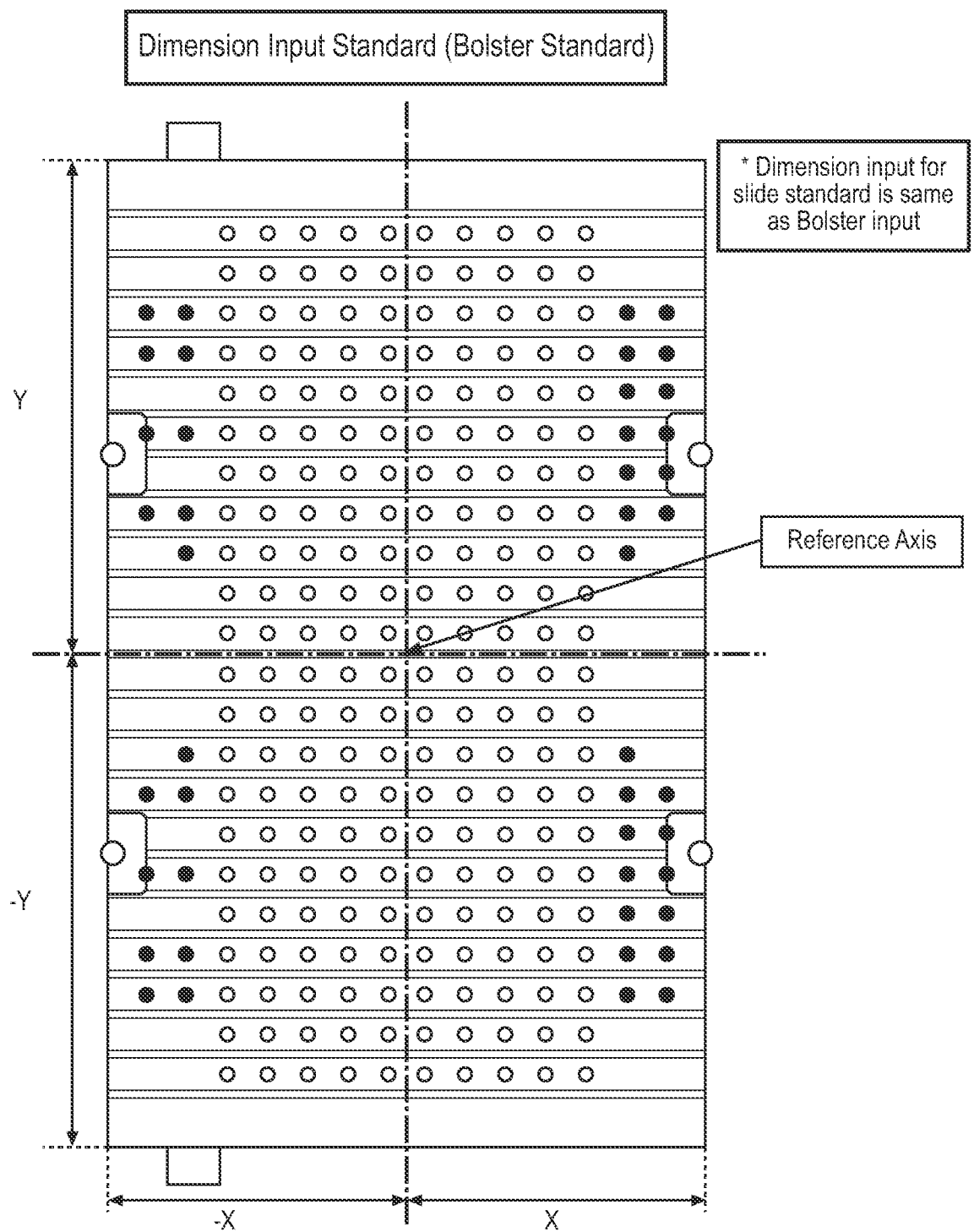
In FIGS. 18a, 18b, 18c, and to 18d, a case is shown of a die overhang check when executing a mode of the automatic inspection system according to the present disclosure.
Figure 18B:
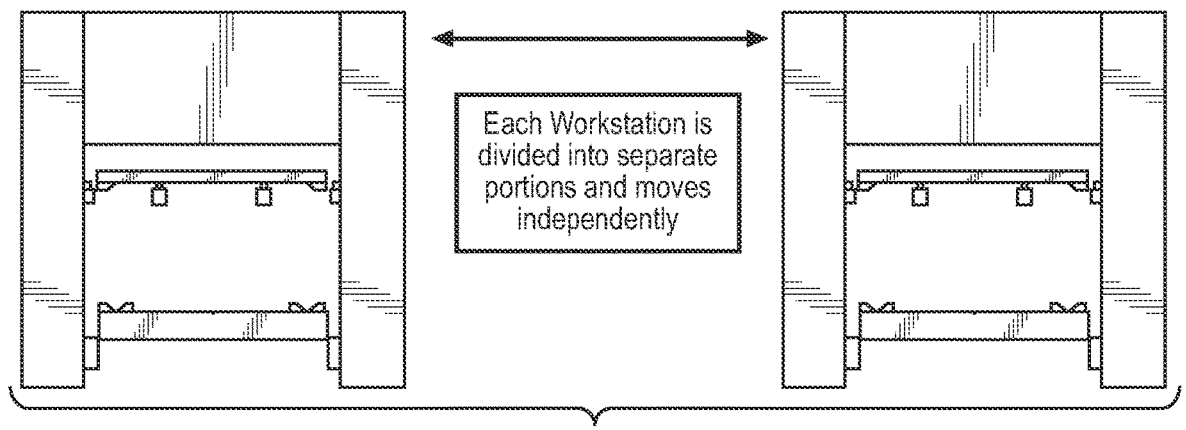
Figure 18C:
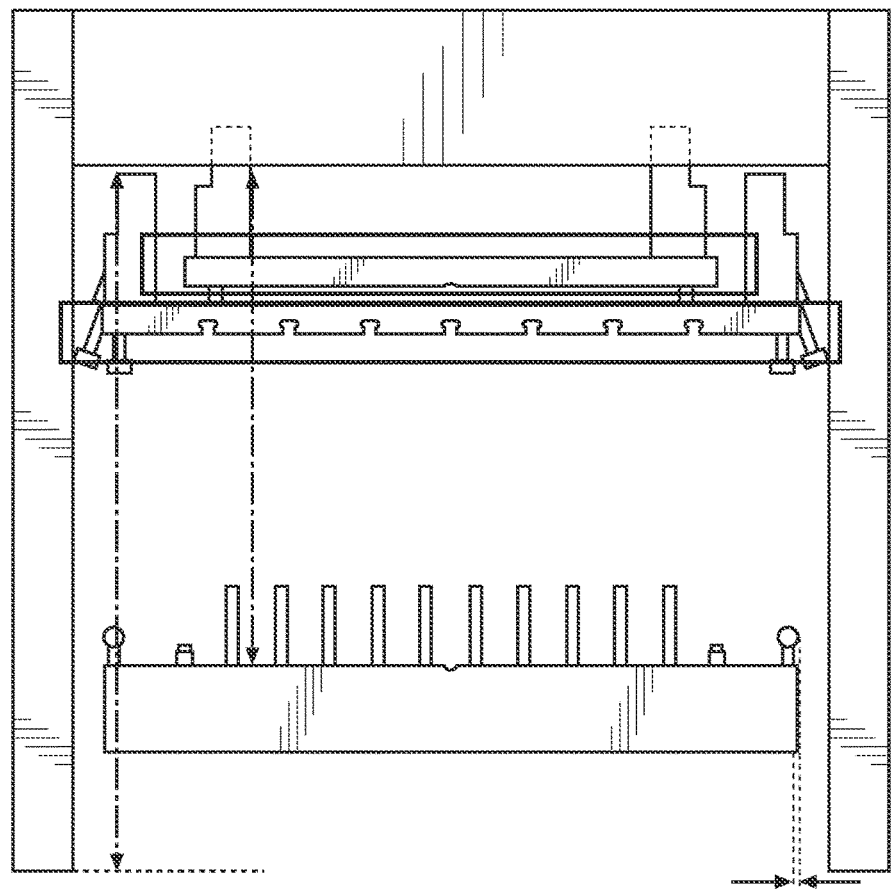
Figure 18D:
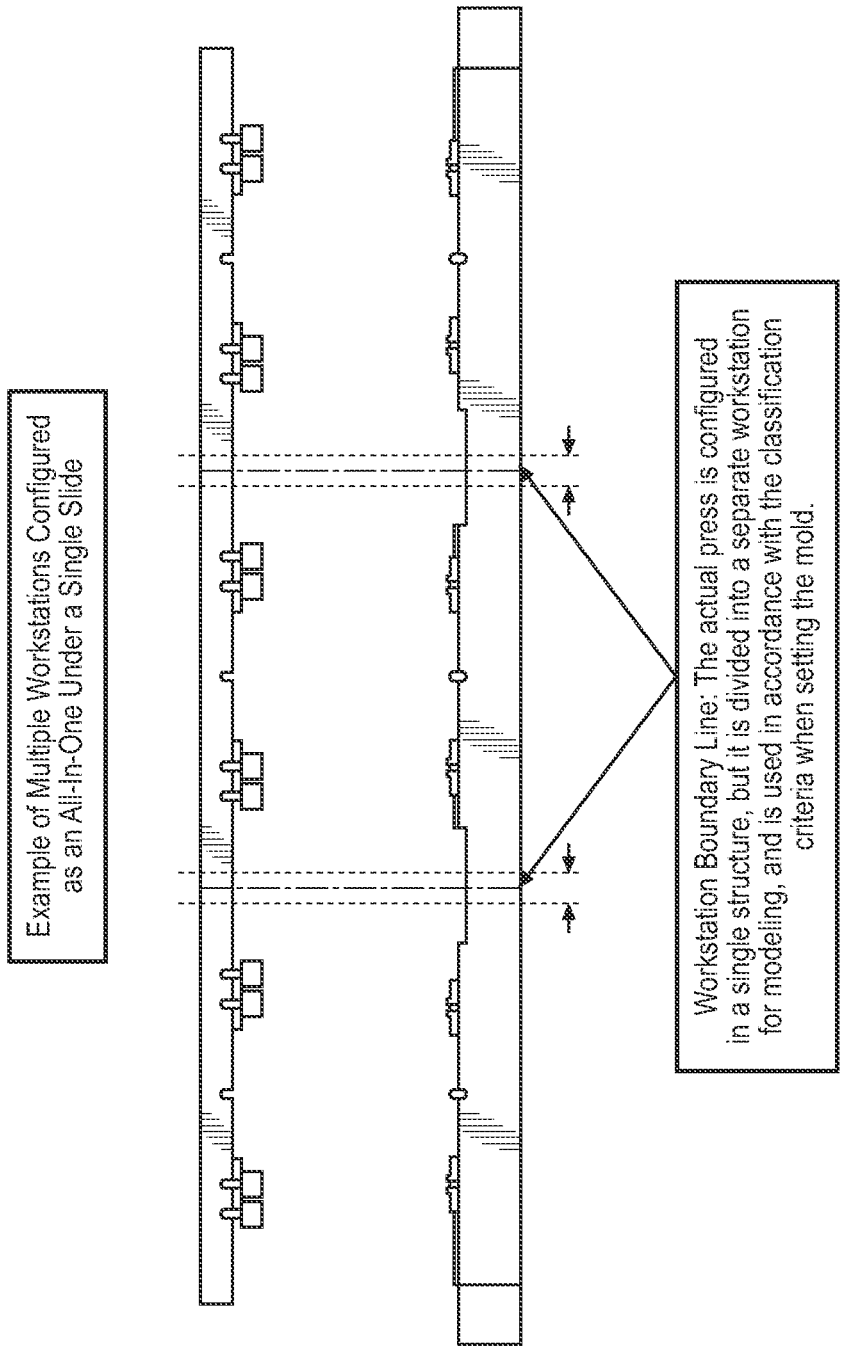

The lift lug check item will be described with reference to FIG. 17. When a lift lug structure other than the mentioned lift pin is applied for handling of basic mold lifting, turnover, etc. the check automatically verifies that the design specifications of the lift lug are sufficient to handle the weight of the mold and that the structural design is designed to the standard.

Specifically, since there is no technology called "Lift Lug" in the design data, the designer or inspection must directly select the circular surface of the lift lug so that the program can recognize the information of the lift lug.

The measurement items of each structural part are measured based on the center line of the selected object. Separately, the automatically measured total weight of the mold is compared to the allowable weight standard of the corresponding lift lug. If the measured values of the structural part are consistent with the standard, and the total weight of the mold relative to the allowable weight of the lift lug is small, it is determined as OK, and if one of the two conditions (structure and allowable weight) is not satisfied, it is determined as NG.

What is claimed is:

1. An inspection method using an automatic inspection system comprising the following:
    (a) a step of loading a 3D file from which a program has been selected;
    (b) a step of inputting into the program information on one or more selected components of a mold assembly of the 3D file loaded into the program;
    (c) a step of checking a setting value of the one or more selected components of the mold assembly according to a mode selected from a check list preset in the program; and
    (d) a step wherein, if the setting value of the one or more components of the mold assembly selected in step (c) is out of a range of a value set in the selected mode, a color of the component out of the range is changed to a preset color and monitored,
    wherein the one or more selected components of a mold assembly include one or more lift pins affixed to the mold assembly and wherein the information includes a weight of the mold assembly.

2. The inspection method using an automatic inspection system according to claim 1, further comprising, after step (d) above, a step of providing a monitoring result through a pop-up window.

3. The inspection method using an automatic inspection system according to claim 2, further comprising a step of providing the monitoring result value provided through the pop-up window as an Excel file.

4. The inspection method using an automatic inspection system according to claim 3, further comprising, when the mode selected in (c) above is a press setting check mode, (c1) a step of comparing an outermost size of the mold assembly and a press value by a preset method.

5. The inspection method using an automatic inspection system according to claim 4, wherein the preset method of (c1) serves to recognize and compare the outermost size of the mold assembly as a hexahedron.

6. The inspection method using an automatic inspection system according to claim 1, wherein the mode further comprises a mold die safety check mode.

7. An inspection method using an automatic inspection system comprising the following:
    (a) a step of loading a 3D file from which a program has been selected;
    (b) a step of inputting into the program information on one or more selected components of a mold assembly of the 3D file loaded into the program;
    (c) a step of checking a setting value of the one or more selected components of the mold assembly according to a mode selected from a check list preset in the program; and
    (d) a step wherein, if the setting value of the one or more components of the mold assembly selected in step (c) is out of a range of a value set in the selected mode, a color of the component out of the range is changed to a preset color and monitored,
    wherein the one or more selected components of a mold assembly include one or more retaining pins and wherein the information includes a weight of the mold assembly.

* * * * *